United States Patent
Klein Gunnewiek et al.

(10) Patent No.: US 7,146,056 B2
(45) Date of Patent: Dec. 5, 2006

(54) EFFICIENT SPATIAL SCALABLE COMPRESSION SCHEMES

(75) Inventors: Reinier Bernardus Maria Klein Gunnewiek, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 708 days.

(21) Appl. No.: 10/278,282

(22) Filed: Oct. 23, 2002

(65) Prior Publication Data

US 2003/0086622 A1 May 8, 2003

(30) Foreign Application Priority Data

Oct. 26, 2001 (EP) .................................. 01204066
Mar. 8, 2002 (EP) .................................. 02075916

(51) Int. Cl.
*G06K 9/36* (2006.01)
*G06K 9/46* (2006.01)

(52) U.S. Cl. ...................... 382/236; 382/240; 382/248; 375/240.16

(58) Field of Classification Search ................ 382/236, 382/240, 248, 250; 375/240.16
See application file for complete search history.

(56) References Cited

U.S. PATENT DOCUMENTS

| | | | |
|---|---|---|---|
| 6,414,991 B1 * | 7/2002 | Yagasaki et al. ........ | 375/240.12 |
| 6,728,317 B1 * | 4/2004 | Demos ................... | 375/240.21 |
| 6,907,070 B1 * | 6/2005 | Wu et al. ............... | 375/240.12 |

* cited by examiner

*Primary Examiner*—Phuoc Tran (57) ABSTRACT

A method and apparatus is disclosed for enhancing the efficiency of spatial scalable compression schemes by lowering the bitrate of the enhancement layer. The complete image is used during motion estimation and/or motion compensation in the enhancement layer by inserting both the reconstructed video stream from the base layer and the input video stream into the motion estimation unit or both the motion estimation unit and the motion compensation unit in the enhancement layer.

9 Claims, 6 Drawing Sheets

EFFICIENT SPATIAL SCALABLE COMPRESSION SCHEMES

FIELD OF THE INVENTION

The invention relates to a video encoder, and more particularly to a video encoder which uses efficient spatial scalable compression schemes.

BACKGROUND OF THE INVENTION

Because of the massive amounts of data inherent in digital video, the transmission of full-motion, high-definition digital video signals is a significant problem in the development of high-definition television. More particularly, each digital image frame is a still image formed from an array of pixels according to the display resolution of a particular system. As a result, the amounts of raw digital information included in high resolution video sequences are massive. In order to reduce the amount of data that must be sent, compression schemes are used to compress the data. Various video compression standards or processes have been established, including, MPEG-2, MPEG-4, and H.263.

Many applications are enabled where video is available at various resolutions and/or qualities in one stream. Methods to accomplish this are loosely referred to as scalability techniques. There are three axes on which one can deploy scalability. The first is scalability on the time axis, often referred to as temporal scalability. Secondly, there is scalability on the quality axis, often referred to as signal-to-noise scalability or fine-grain scalability. The third axis is the resolution axis (number of pixels in image) often referred to as spatial scalability or layered coding. In layered coding, the bitstream is divided into two or more bitstreams, or layers. Each layer can be combined to form a single high quality signal. For example, the base layer may provide a lower quality video signal, while the enhancement layer provides additional information that can enhance the base layer image.

In particular, spatial scalability can provide compatibility between different video standards or decoder capabilities. With spatial scalability, the base layer video may have a lower resolution than the input video sequence, in which case the enhancement layer carries information which can restore the resolution of the base layer to the input sequence level.

Figure 1:
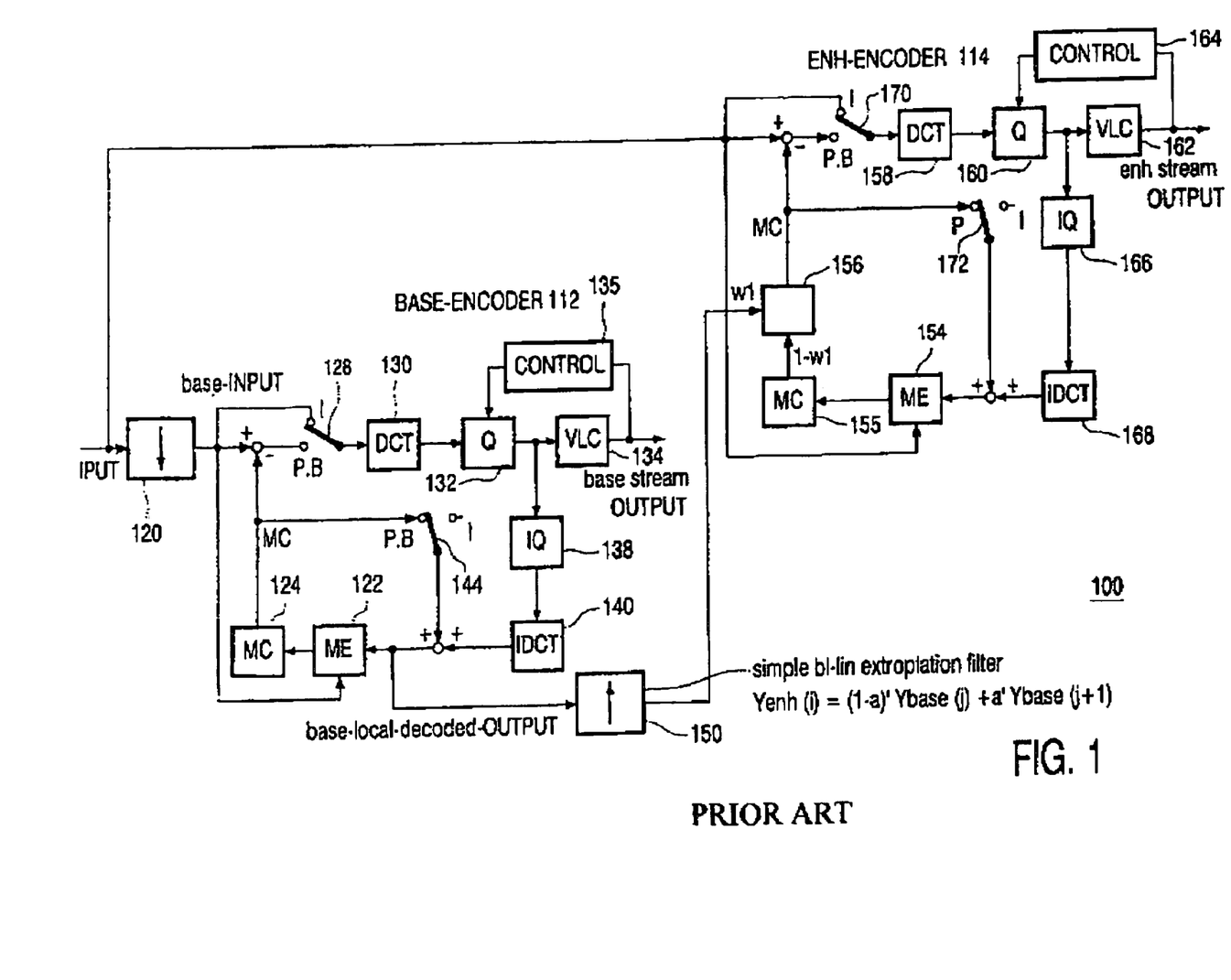
FIG. 1 is a block schematic representation of a known encoder with spatial scalability.

Most video compression standards support spatial scalability. FIG. 1 illustrates a block diagram of an encoder 100 which supports MPEG-2/MPEG-4 spatial scalability. The encoder 100 comprises a base encoder 112 and an enhancement encoder 114. The base encoder is comprised of a low pass filter and downsampler 120, a motion estimator 122, a motion compensator 124, an orthogonal transform (e.g., Discrete Cosine Transform (DCT)) circuit 130, a quantizer 132, a variable length coder 134, a bitrate control circuit 135, an inverse quantizer 138, an inverse transform circuit 140, switches 128, 144, and an interpolate and upsample circuit 150. The enhancement encoder 114 comprises a motion estimator 154, a motion compensator 155, a selector 156, an orthogonal transform (e.g., Discrete Cosine Transform (DCT)) circuit 158, a quantizer 160, a variable length coder 162, a bitrate control circuit 164, an inverse quantizer 166, an inverse transform circuit 168, switches 170 and 172. The operations of the individual components are well known in the art and will not be described in detail.

Unfortunately, the coding efficiency of this layered coding scheme is not very good. Indeed, for a given picture quality, the bitrate of the base layer and the enhancement layer together for a sequence is greater than the bitrate of the same sequence coded at once.

Figure 2:
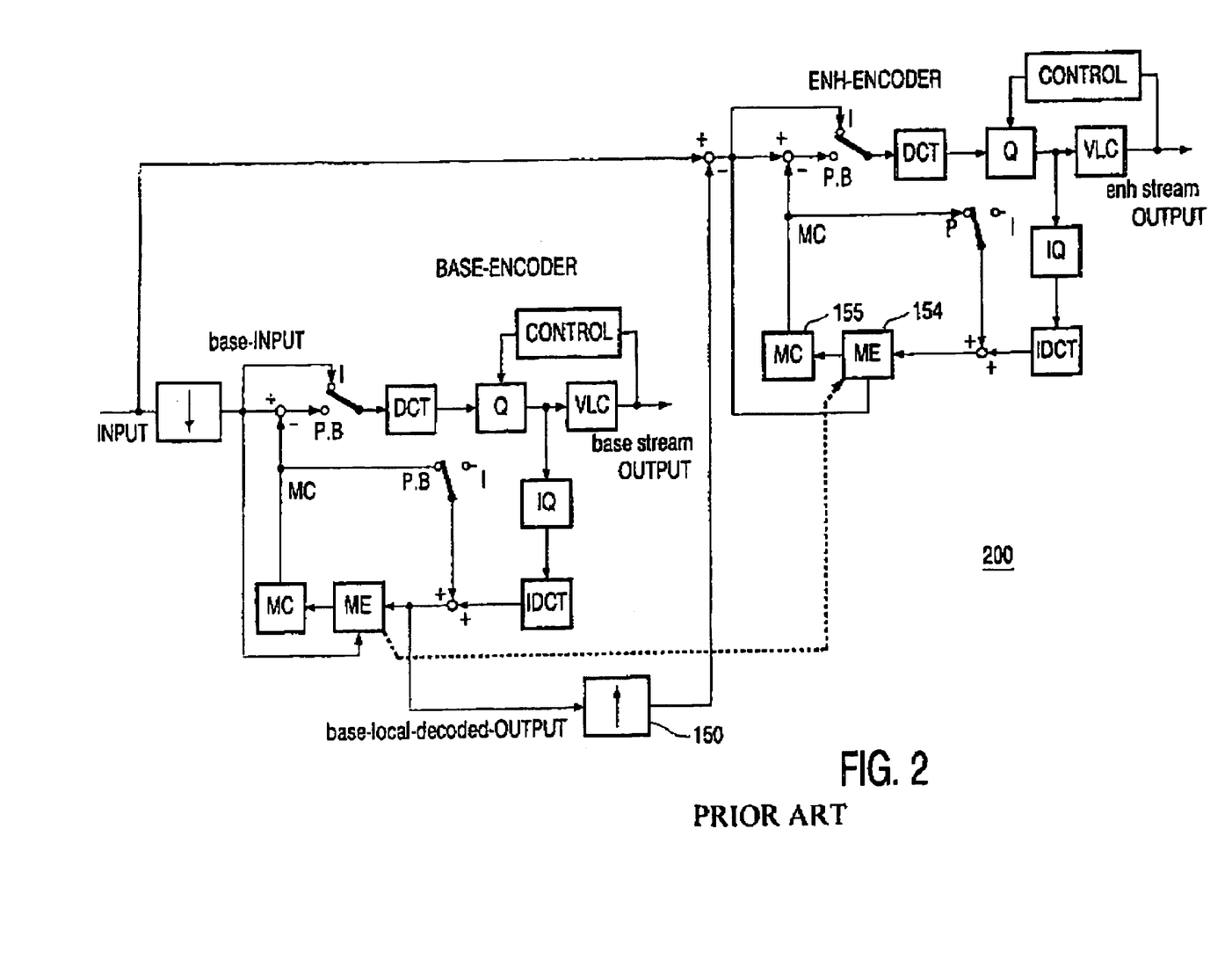
FIG. 2 is a block schematic representation of a known encoder with spatial scalability.

FIG. 2 illustrates another known encoder 200 proposed by DemoGrafx (see U.S. Pat. No. 5,852,565). The encoder is comprised of substantially the same components as the encoder 100 and the operation of each is substantially the same so the individual components will not be described. In this configuration, the residue difference between the input block and the upsampled output from the upsampler 150 is inputted into a motion estimator 154. To guide/help the motion estimation of the enhancement encoder, the scaled motion vectors from the base layer are used in the motion estimator 154 as indicated by the dashed line in FIG. 2. However, this arrangement does not significantly overcome the problems of the arrangement illustrated in FIG. 1.

While spatial scalability, as illustrated in FIGS. 1 and 2, is supported by the video compression standards, spatial scalability is not often used due to a lack of coding efficiency. The lack of efficient coding means that, for a given picture quality, the bit rate of the base layer and the enhancement layer for a sequence together are more than the bit rate of the same sequence coded at once.

SUMMARY OF THE INVENTION

It is an object of the invention to overcome at least one of the above-described deficiencies of the known spatial scalability schemes by providing more efficient spatial scalable compression schemes which reduces the necessary bitrate of the encoder.

According to one embodiment of the invention, a method and apparatus for providing spatial scalable compression of an input video stream is disclosed. The input video stream is downsampled to reduce the resolution of the video stream. The downsampled video stream is encoded to produce a base stream. The base stream is decoded and upconverted to produce a reconstructed video stream. The expected motion between frames from the input video stream and the reconstructed video stream is estimated and motion vectors are calculated for each frame of the received streams based upon the upscaled base layer plus the enhancement layer. The reconstructed video stream is subtracted from the video stream to produce a residual stream. A predicted stream is calculated using the motion vectors in a motion compensation unit. The predicted stream is then subtracted from the residual stream. The resulting residual stream is encoded and outputted as an enhancement stream.

According to another embodiment of the invention, the reconstructed video stream and the input video stream are inputted into both the motion estimation unit and the motion compensation unit in the enhancement layer so that the motion estimation and the motion compensation are performed on the upscaled base layer plus the enhancement layer.

According to another embodiment of the invention, the reconstructed video stream and the input video stream are inputted into both the motion estimation unit and the motion compensation unit in the enhancement layer so that the motion estimation and the motion compensation are performed on the upscaled base layer plus the enhancement layer. After the motion compensation has been performed, the reconstructed video stream is subtracted from the predicted signal outputted from the motion compensation unit. Embodiments of the invention can be applied to two-layer DVDs or to two-layer broadcasting, where the first layer is the SD layer and the first layer plus the second layer make up the HD layer.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE INVENTION

Figure 3:
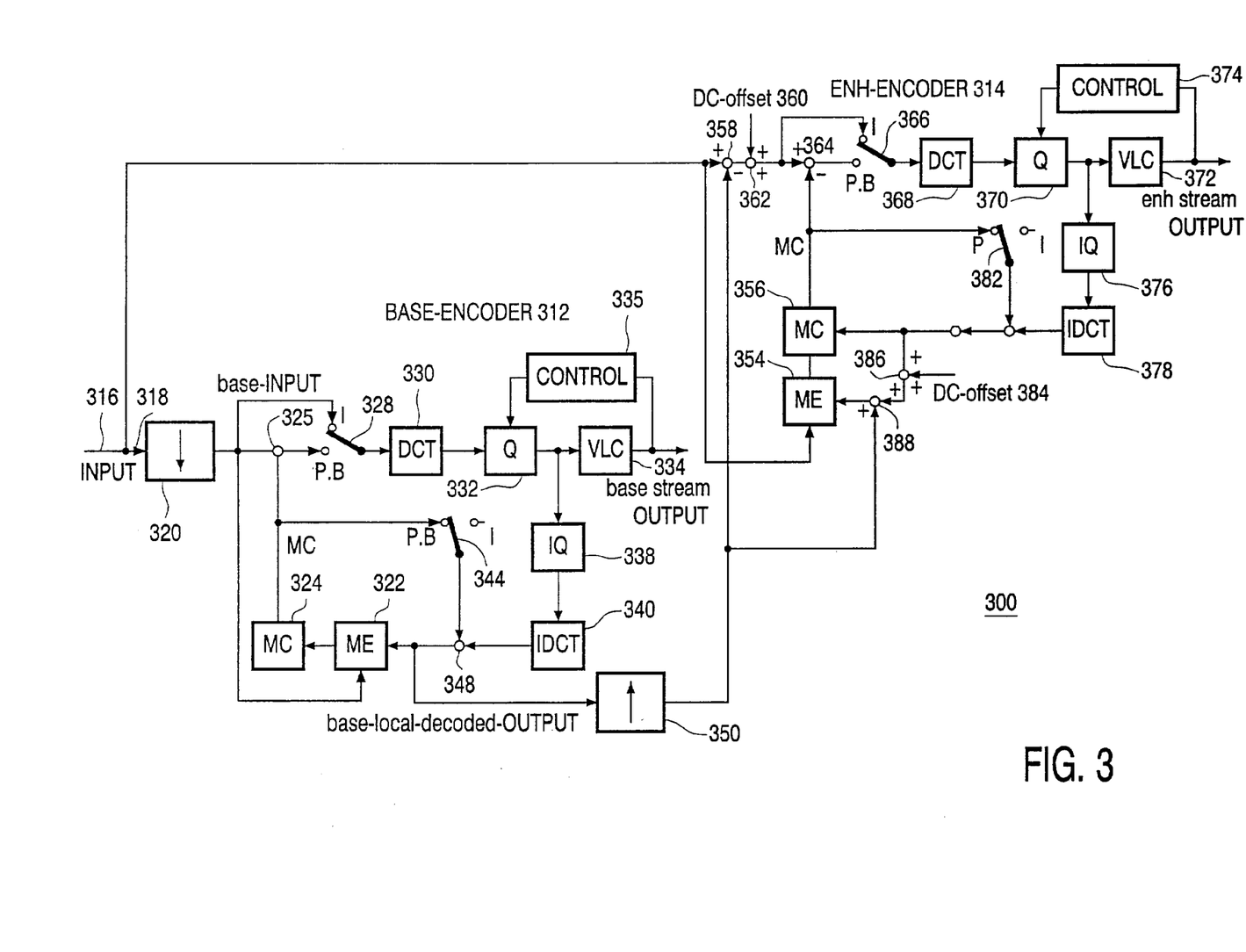
FIG. 3 is a block schematic representation of an encoder with spatial scalability according to one embodiment of the invention.

FIG. 3 is a schematic diagram of an encoder according to one embodiment of the invention. The depicted encoding system 300 accomplishes layered compression, whereby a portion of the channel is used for providing a low resolution base layer and the remaining portion is used for transmitting edge enhancement information, whereby the two signals may be recombined to bring the system up to high resolution.

The encoder 300 comprises a base encoder 312 and an enhancement encoder 314. The base encoder is comprised of a low pass filter and downsampler 320, a motion estimator 322, a motion compensator 324, an orthogonal transform (e.g., Discrete Cosine Transform (DCT)) circuit 330, a quantizer 332, a variable length coder (VLC) 334, a bitrate control circuit 335, an inverse quantizer 338, an inverse transform circuit 340, switches 328, 344, and an interpolate and upsample circuit 350.

An input video block 316 is split by a splitter 318 and sent to both the base encoder 312 and the enhancement encoder 314. In the base encoder 312, the input block is inputted into a low pass filter and downsampler 320. The low pass filter reduces the resolution of the video block which is then fed to the motion estimator 322. The motion estimator 322 processes picture data of each frame as an I-picture, a P-picture, or as a B-picture. Each of the pictures of the sequentially entered frames is processed as one of the I-, P-, or B-pictures in a pre-set manner, such as in the sequence of I, B, P, B, P, . . . , B, P. That is, the motion estimator 322 refers to a pre-set reference frame in a series of pictures stored in a frame memory not illustrated and detects the motion vector of a macro-block, that is, a small block of 16 pixels by 16 lines of the frame being encoded by pattern matching (block Matching) between the macro-block and the reference frame for detecting the motion vector of the macro-block.

In MPEG, there are four picture prediction modes, that is an intra-coding (intra-frame coding), a forward predictive coding, a backward predictive coding, and a bi-directional predictive-coding. An I-picture is an intra-coded picture, a P-picture is an intra-coded or forward predictive coded or backward predictive coded picture, and a B-picture is an intra-coded, a forward predictive coded, or a bi-directional predictive-coded picture.

The motion estimator 322 performs forward prediction on a P-picture to detect its motion vector. Additionally, the motion estimator 322 performs forward prediction, backward prediction, and bi-directional prediction for a B-picture to detect the respective motion vectors. In a known manner, the motion estimator 322 searches, in the frame memory, for a block of pixels which most resembles the current input block of pixels. Various search algorithms are known in the art. They are generally based on evaluating the mean absolute difference (MAD) or the mean square error (MSE) between the pixels of the current input block and those of the candidate block. The candidate block having the least MAD or MSE is then selected to be the motion-compensated prediction block. Its relative location with respect to the location of the current input block is the motion vector.

Upon receiving the prediction mode and the motion vector from the motion estimator 322, the motion compensator 324 may read out encoded and already locally decoded picture data stored in the frame memory in accordance with the prediction mode and the motion vector and may supply the read-out data as a prediction picture to arithmetic unit 325 and switch 344. The arithmetic unit 325 also receives the input block and calculates the difference between the input block and the prediction picture from the motion compensator 324. The difference value is then supplied to the DCT circuit 330.

If only the prediction mode is received from the motion estimator 322, that is, if the prediction mode is the intra-coding mode, the motion compensator 324 may not output a prediction picture. In such a situation, the arithmetic unit 325 may not perform the above-described processing, but instead may directly output the input block to the DCT circuit 330.

The DCT circuit 330 performs DCT processing on the output signal from the arithmetic unit 325 so as to obtain DCT coefficients which are supplied to a quantizer 332. The quantizer 332 sets a quantization step (quantization scale) in accordance with the data storage quantity in a buffer (not illustrated) received as a feedback and quantizes the DCT coefficients from the DCT circuit 330 using the quantization step. The quantized DCT coefficients are supplied to the VLC unit 334 along with the set quantization step.

The VLC unit 334 converts the quantization coefficients supplied from the quantizer 332 into a variable length code, such as a Huffman code, in accordance wth the quantization step supplied from the quantizer 332. The resulting converted quantization coefficients are outputted to a buffer not illustrated. The quantization coefficients and the quantization step are also supplied to an inverse quantizer 338 which dequantizes the quantization coefficients in accordance with the quantization step so as to convert the same to DCT coefficients. The DCT coefficients are supplied to the inverse DCT unit 340 which performs inverse DCT on the DCT coefficients. The obtained inverse DCT coefficients are then supplied to the arithmetic unit 348.

The arithmetic unit 348 receives the inverse DCT coefficients from the inverse DCT unit 340 and the data from the motion compensator 324 depending on the location of switch 344. The arithmetic unit 348 sums the signal (prediction residuals) from the inverse DCT unit 340 to the predicted picture from the motion compensator 324 to locally decode the original picture. However, if the prediction mode indicates intra-coding, the output of the inverse DCT unit 340 may be directly fed to the frame memory. The decoded picture obtained by the arithmetic unit 348 is sent to and stored in the frame memory so as to be used later as a reference picture for an inter-coded picture, forward predictive coded picture, backward predictive coded picture, or a bi-directional predictive coded picture.

The enhancement encoder 314 comprises a motion estimator 354, a motion compensator 356, a DCT circuit 368, a quantizer 370, a VLC unit 372, a bitrate controller 374, an inverse quantizer 376, an inverse DCT circuit 378, switches 366 and 382, subtractors 358 and 364, and adders 380 and 388. In addition, the enhancement encoder 314 may also include DC-offsets 360 and 384, adder 362 and subtractor 386. The operation of many of these components is similar to the operation of similar components in the base encoder 312 and will not be described in detail.

The output of the arithmetic unit 348 is also supplied to the upsampler 350 which generally reconstructs the filtered out resolution from the decoded video stream and provides a video data stream having substantially the same resolution as the high-resolution input. However, because of the filtering and losses resulting from the compression and decompression, certain errors are present in the reconstructed stream. The errors are determined in the subtraction unit 358 by subtracting the reconstructed high-resolution stream from the original, unmodified high resolution stream.

According to one embodiment of the invention illustrated in FIG. 3, the original unmodified high-resolution stream is also provided to the motion estimator 354. The reconstructed high-resolution stream is also provided to an adder 388 which adds the output from the inverse DCT 378 (possibly modified by the output of the motion compensator 356 depending on the position of the switch 382). The output of the adder 388 is supplied to the motion estimator 354. As a result, the motion estimation is performed on the upscaled base layer plus the enhancement layer instead of the residual difference between the original high-resolution stream and the reconstructed high-resolution stream. This motion estimation produces motion vectors that track the actual motion better than the vectors produced by the known systems of FIGS. 1 and 2. This leads to a perceptually better picture quality especially for consumer applications which have lower bit rates than professional applications.

Furthermore, a DC-offset operation followed by a clipping operation can be introduced into the enhancement encoder 314, wherein the DC-offset value 360 is added by adder 362 to the residual signal output from the subtraction unit 358. This optional DC-offset and clipping operation allows the use of existing standards, e.g., MPEG, for the enhancement encoder where the pixel values are in a predetermined range, e.g., 0 . . . 0.255. The residual signal is normally concentrated around zero. By adding a DC-offset value 360, the concentration of samples can be shifted to the middle of the range, e.g., 128 for 8 bit video samples. The advantage of this addition is that the standard components of the encoder for the enhancement layer can be used and result in a cost efficient (re-use of IP blocks) solution. In the enhancement layer decoding the DC-offset need to be compensated for, e.g. by subtracting the DC-offset from the decoded enhancement layer.

Figure 4:
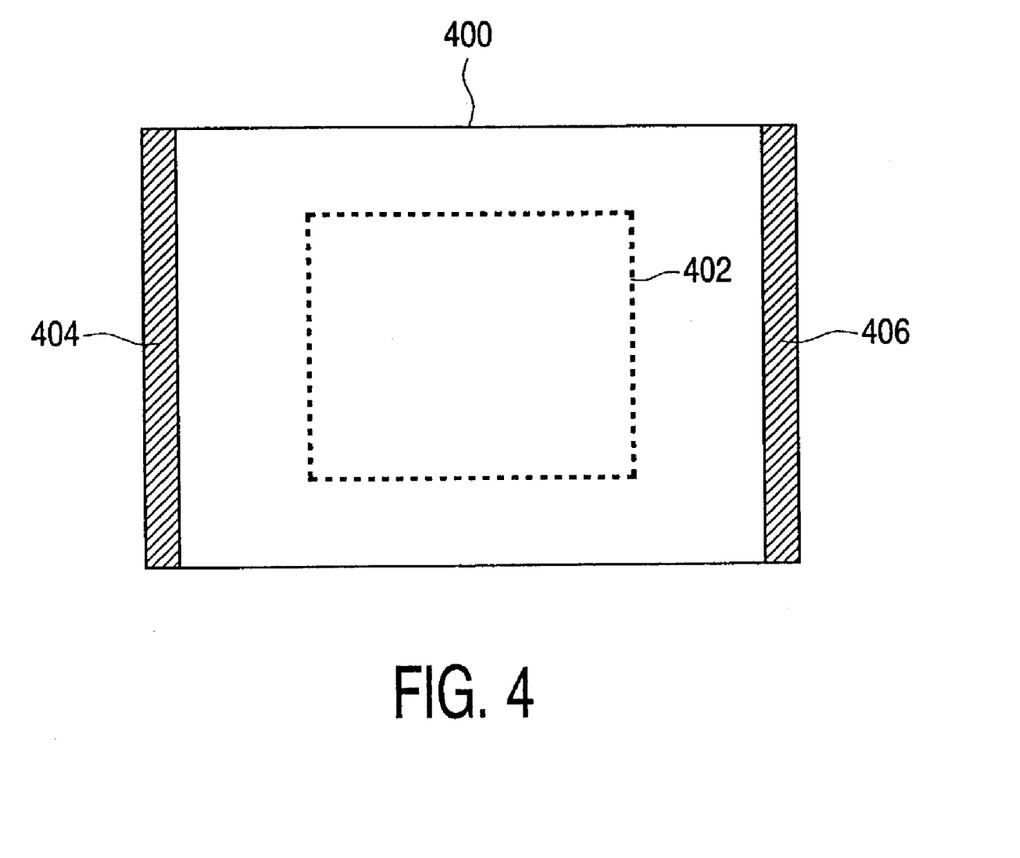
FIG. 4 is a depiction of side panels after upscaling.

One drawback of the schemes illustrated in FIGS. 1–3 is that they cannot cope well with side panels. Side panels occur when the aspect ratios between the horizontal and vertical resolution of the base layer and the enhancement layer are not equal. To illustrate this point a standard definition/high definition spatial scalable scheme will be described. In this scheme, the base layer is a high definition sequence and the base layer plus the enhancement layer make up the high definition version of the sequence. The resolution of a standard definition image is for example 720 by 480 pixels (NTSC). The resolution of a high definition image is for example 1920 by 1440 pixels (one of the ATSC resolutions). The standard definition image is scaled to fit the HD image, but the aspect ratios are not the same. This results in side panels as illustrated in FIG. 4. The dashed box 402 indicates the standard definition image. The upscaled standard definition image is indicated by the dot-dashed box 404. In order to keep the aspect ratio, some parts of the high definition image are not covered by the upscaled standard definition image, indicated by the shaded boxes 406 at both sides of the image 400.

Figure 5:
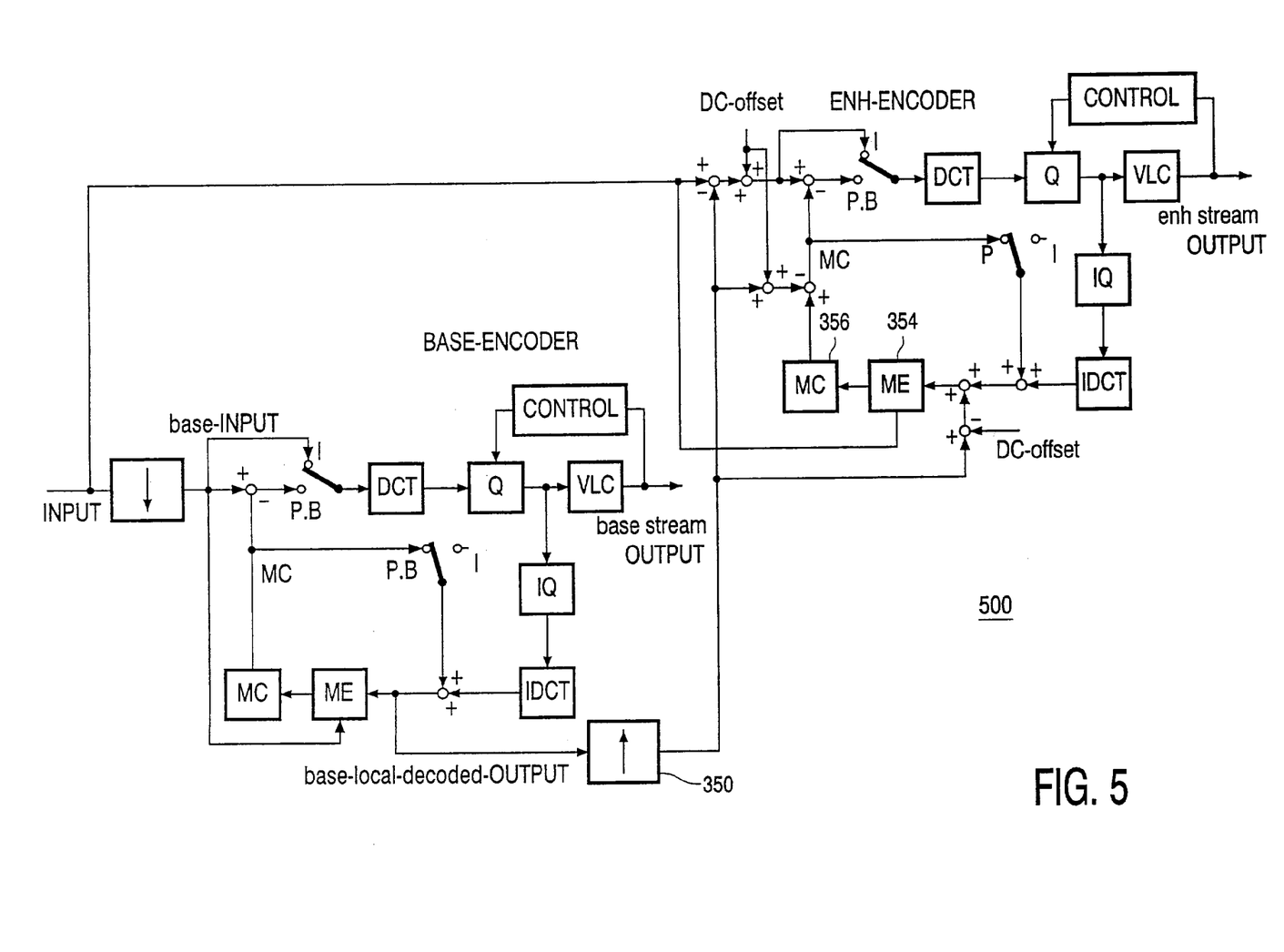
FIG. 5 is a block schematic representation of an encoder with spatial scalability according to another embodiment of the invention.

FIG. 5 is a schematic diagram of an encoder which better copes with side panels than the previously described encoders in FIGS. 1–3. As noted from FIG. 5, the encoder 500 has substantially the same components as the encoder 300 illustrated in FIG. 3 except that some of the inputs and outputs have been rerouted. In encoder 300, the motion estimation is performed on the entire image but the compensation is done on the residual signal. In this embodiment, the encoder 500 insets the upscaled base layer is inserted into the motion compensation loop so that the motion estimation and the motion compensation is performed on the full image. This results in better motion estimation and compensation which results in less problems with side panels. As a result better coding efficiency can be achieved. As noted in FIG. 5, DC-offset values can be inserted into the enhancement layer as described above with respect to FIG. 3.

Figure 6:
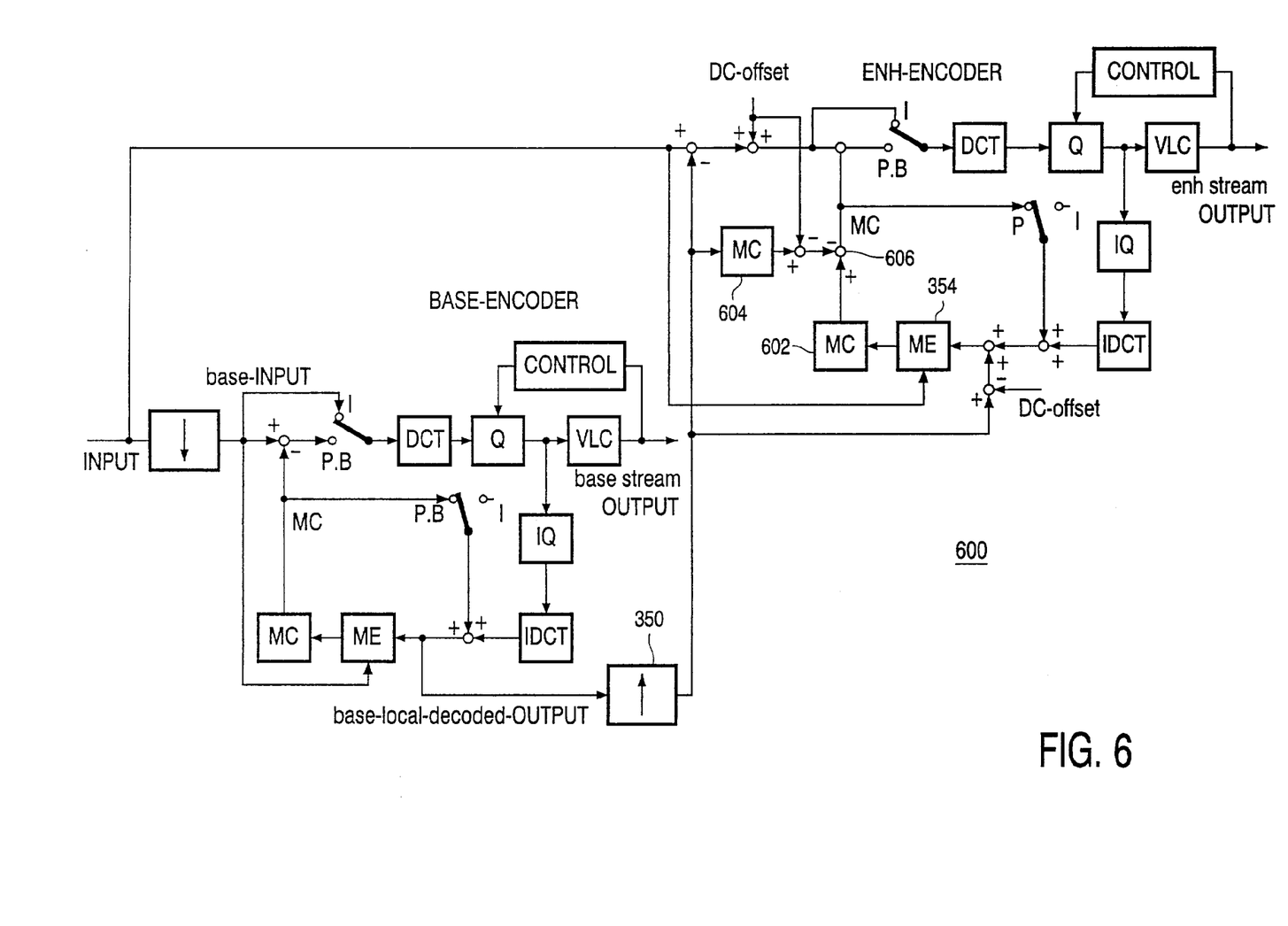
FIG. 6 is a block schematic representation of an encoder with spatial scalability according to another embodiment of the invention.

FIG. 6 is a schematic diagram of another encoder 600 which provides motion estimation and compensation on the full image in the enhancement layer. In this embodiment, the encoder 600 inserts the upscaled base layer in the motion compensation loop so that the motion estimation and compensation are performed on the upscaled base layer and the enhancement layer. In addition, the upscaled base layer is inputted into a second motion compensator 604. The output of the second motion compensator 604 is subtracted from the output of the first motion compensator 602 in subtractor 606 so as to remove the base layer after the motion compensation. The subtraction of the base layer results in better coding efficiency for typical bit rates. Furthermore, as noted in FIG. 6, DC-offset and clipping values can be inserted into the enhancement layer as described above with respect to FIG. 3.

The above-described embodiments of the invention enhance the efficiency of spatial scalable compression schemes by lowering the bitrate of the enhancement layer by using the complete image in motion estimation and/or motion compensation in the enhancement layer. This improves the coding efficiency especially for the lower bitrate applications and leads to a perceptually better picture quality. It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention claimed is:

1. An apparatus for performing spatial scalable compression of an input video stream including an encoder for encoding and outputting the video stream in a compressed form, comprising:
   a base layer comprising an encoded bitstream having relatively low resolution;
   a high resolution enhancement layer comprising an encoded bitstream having a relatively high resolution;
   wherein an upsealed reconstructed bitstream outputted by the base layer added with a local decoded enhancement layer are subjected to a DC-offset and combined with the input video stream as inputs to a motion estimator in the high resolution enhancement layer, wherein the motion estimator produces motion vectors based upon an upsealed base layer plus enhancement layer.

2. A layered encoder for encoding an input video stream, comprising:
   a downsampling unit for reducing the resolution of the video stream;
   a base encoder for encoding a lower resolution base stream;
   an upconverting unit for decoding and increasing the resolution of the base stream to produce a reconstructed video stream;
   a motion estimation unit which receives the input video stream and the reconstructed video stream and calculates motion vectors for each frame of the received streams based upon an upsealed base layer plus enhancement layer,
   a first subtraction unit for subtracting the reconstructed video stream from the input video stream to produce a residual stream;
   a motion compensation unit which receives the motion vectors from the motion estimation unit and produces a predicted stream;
   a second subtraction unit for subtracting the predicted stream from the residual stream, thereby yielding a resulting stream; and,
   an enhancement encoder for encoding the resulting stream from the second subtraction unit and outputting an enhancement stream.

3. The encoder according to claim 2, wherein the reconstructed video stream from the base layer and the input video stream are supplied before the motion detector and the motion compensation unit in the enhancement layer and subtracted after the motion estimator and motion compensation unit so that the motion estimation and motion compensation are performed on the upscaled base layer plus the enhancement layer.

4. The encoder according to claim 3, further comprising:
   a third subtraction unit for subtracting the reconstructed video stream from the predicted stream prior to being inputted into the second subtraction unit.

5. The encoder according to claim 2, further comprising:
   a DC-offset unit for adding a DC-offset value plus a clipping value into the residual stream prior to the residual stream being inputted into the second subtraction unit.

6. A method for providing spatial scalable compression of an input video stream, comprising the steps of:
   downsampling the input video stream to reduce the resolution of the video stream;
   encoding the downsampled video stream to produce a base stream; decoding and upconverting the base stream to produce a reconstructed video stream;
   estimating the expected motion between frames from the input video stream and the reconstructed video stream and calculating motion vectors for each frame of the received streams based upon an upscaled base layer plus enhancement layer;
   subtracting the reconstructed video stream from the video stream to produce a residual stream;
   calculating a predicted stream using the motion vectors in a motion compensation unit;
   subtracting the predicted stream from the residual stream, thereby yielding a resulting stream; and
   encoding the resulting stream and outputting an enhancement stream.

7. The method according to claim 6, wherein the reconstructed video stream from the base layer and the input video stream are supplied to the motion compensation unit so that the motion compensation is performed on the upscaled base layer plus the enhancement layer.

8. The method according to claim 7, further the step of:
   subtracting the reconstructed video stream from the predicted stream prior to being to the predicted stream being subtracted from the residual stream.

9. The method according to claim 6, further comprising the step of:
   adding a DC-offset value plus a clipping value into the residual stream prior to the predicted stream being subtracted from the residuals.

* * * * *